United States Patent Office 3,357,990
Patented Dec. 12, 1967

3,357,990
THIO BIS SUCCINIMIDES
Billy D. Vineyard, Bellefontaine Neighbors, Mo., assignor to Monsanto Company, St. Louis, Mo., a corporation of Delaware
No Drawing. Original application Nov. 6, 1961, Ser. No. 150,202, now Patent No. 3,299,121, dated Jan. 17, 1967. Divided and this application Aug. 16, 1966, Ser. No. 592,247
7 Claims. (Cl. 260—326.3)

ABSTRACT OF THE DISCLOSURE

Thio bis succinimides which are useful as lube oil additives.

---

The present application is a division of copending application Ser. No. 150,202, filed Nov. 6, 1961, now Patent No. 3,229,121.

This invention relates to novel thioesters, their nitrogen derivatives and methods of preparing the same. More particularly, the invention relates to novel thio bis succinimides.

Specifically, the invention is directed to thio bis half esters of succinic acids and nitrogenization products thereof including thio bis succinimides. The amine derivatives of these half esters are lube oil additives, serving a dual role as detergent-dispersants and as antioxidants.

It is therefore an object of this invention to provide new and novel thio bis (acid esters) and their amine derivatives. A more specific object of this invention is to provide novel thio bis succinimides.

In accordance with this invention these and other objects are accomplished, generally speaking, by reacting hydrogen sulfide in the presence of a basic catalyst with an acid or half ester of maleic, citraconic or itaconic acid to obtain the corresponding thio bis (acid succinate) or bis (acid methyl-succinate). The thioesters thus prepared can be employed as antioxidant oil additives, or can be readily nitrogenized in the synthesis of their amine derivatives.

More specifically this invention contemplates the preparation of the thioesters under consideration by a process wherein hydrogen sulfide, a basic catalyst, and an acid or half ester of maleic, citraconic or itaconic acid are placed in intimate contact and the contact maintained until the reaction between them is substantially complete and the reactants converted to the corresponding thio bis (acid succinate). The requisite intimate contact is preferably obtained by preparing a solution of the reactants and the catalysts, or by passing hydrogen sulfide through a solution of the acid ester and the basic catalyst. However, when hydrogen sulfide and the acid ester are mutually soluble, the inert solvent and recovery problems attendant thereto can be completely eliminated.

The reaction between hydrogen sulfide and the acid maleate can be normally carried out at room temperature, that is about 20° C., but it may be prefered to accelerate the reaction by utilizing a somewhat higher temperature. Generally speaking, the temperatures employed are in the range between room temperature and the boiling point of the reaction mixture. After the reaction has gone to completion, the residual thio bis (acid succinate) produced can be best recovered by removal of the solvent medium by conventional means, such as vacuum distillation.

A variety of organic solvents or solvent mixtures, either polar or non-polar, can be used in accordance with this invention. It is only necessary that they be capable of dissolving the reactants and the catalysts while not reacting with them. Suitable non-polar solvents include benzene, toluene, xylene, chloroform, carbon tetrachloride and the like. Satisfactory polar solvents include water, dioxane, tetrahydrofuran, acetone, ethyl methyl ketone, diethyl ether, glycol dimethyl ether, mixtures of dioxane and dimethylformamide and the like. The amount of solvent is not particularly critical but must be sufficient to insure substantial solution of the reactants and the catalysts. For economic reasons, however, it is preferred to maintain the amount of solvent to a minimum so as to eliminate excessive costs in its subsequent removal.

Preferably, when the reaction is executed under pressure, one mole of hydrogen sulfide is introduced into the reaction mixture for each two moles of the half ester present. The ratio can, of course, be varied somewhat, but for optimum yields and economy of operation, it is preferred to approximate these proportions. However, for a non-pressure reaction, an excess of hydrogen sulfide is passed through a solution of the half ester until the reaction is complete. This excess compensates for any hydrogen sulfide that passes through the reaction mixture without reacting with the acid maleate.

The basic catalyst used in the preparation of the thio bis (acid esters) can be any of a wide variety of basic components. For example, one may use a tertiary amine, such as triethylamine, benzyldimethylamine, triethylenediamine, pyridine and the like. However, alkali alkoxides and alkaline earth alkoxides, such as sodium methylate, potassium ethylate, alkali thiolates and alkaline earth thiolates, such as sodium methylthiolate, lithium ethylthiolate, alkali and alkaline earth metal salts of phenols and thiophenols, including sodium phenate, sodium thiophenate and anhydrous quarternary ammonium hydroxides, such as trimethyl benzyl ammonium hydroxide and the like can be used with equal facility. Other bases such as sodium amide, lithium amide, sodium hydride, lithium hydride, sodium sulfide and the like also may be used. It has been found that the reactions of this invention can be executed using as little as about 0.01% catalyst based on the weight of hydrogen sulfide. In most instances, it is preferred to use between about 0.1% and about 3% catalyst to insure efficient catalysis. Larger amounts can, of course, be used, but they serve no useful purpose.

The exact manner in which these catalysts function is not precisely known. It is believed, however, that the mechanism of this reaction may be represented as a Michael type of addition of a thiol anion to a polarized double bond. The apparent function of the base is to effect ionization of hydrogen sulfide to its anion.

The following reaction is illustrative of the preparation of thio bis (acid succinates) by the reaction of hydrogen sulfide with an acid ester of maleic acid:

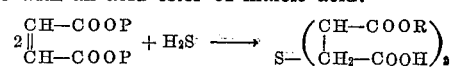

In the above equation R represents a hydrocarbon radical containing between 1 and 20 carbon atoms. This radical may be alkyl, alkenyl, aryl or alkylaryl, and substituted or unsubstituted. The particular nature of radical R and the presence or absence of substituents thereon has little if any effect no the operability of the process. Thus, when it is desired to impart particular characteristics to, or to enhance the properties of the resultant thio bis (acid succinate), R can contain one or more substituents, such as halogens, nitro groups, and the like.

In addition to their utility per se, the thio bis (acid succinates) of the present invention are uniquely useful in the preparation of their novel amine derivatives. In fact, they represent the only group of compounds that can be economically used in the commercial production of such amine oil additives. These amine derivatives are readily prepared by nitrogenization of the thio bis (acid succinates). This is accomplished in the case of the acid succinate-amine salts and of the succinimides by reacting the thio bis (acid succinate) directly with an amine. The type of derivative obtained by the reaction is dependent upon the operating conditions. When relatively mild temperatures and short reaction times are used, the acid succinate-amine salts are formed. Conversely, higher temperatures and longer reaction times result in the formation of the corresponding succinamide. The nitrogenization reactions are generally conducted in solvents of the type described above in connection with the thio bis (acid succinate) formation.

The following equation is representative of those required for the preparation of succinamides.

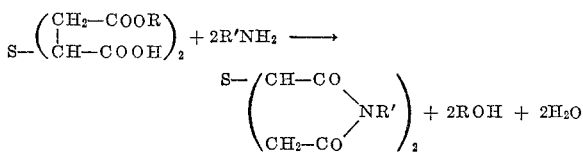

In this reaction R and R' are hydrocarbon radicals containing between 1 and 20 carbon atoms, and preferably a total at least 12 carbon atoms to insure oil solubility. Here again, the radicals may be alkyl, alkenyl, aryl or alkylaryl, and substituted or unsubstituted. When substituents are present, they may be those enumerated above in connection with the reaction for the formation of the thio bis (acid succinates).

The reaction, in a solvent of the type enumerated above, between a primary amine and a thio bis (acid succinate) in a molar ratio of about 2:1 results in the formation of the corresponding succinimide. In order to obtain satisfactory yields of the succinimides, the reaction temperature must be maintained between about 120° C. and about 150° C., and the alcohol and water formed removed throughout the course of the reaction. At temperatures below 120° C. the yield of the succinimide drops off appreciably, and a mixed product containing considerable proportions of the ester-amides and ester-amine salts is formed. On the other hand, temperatures above about 150° C. are difficult to maintain and have objectionable side reactions.

The thio bis succinyl compounds of the present invention range in physical properties from clear fluid to oily liquids. Their physical form is apparently dependent at least partially on the size and structure of the groups contained therein. Most of these compounds are insoluble in water, but readily soluble in commercially available organic solvents. Also those having higher molecular weights are soluble or dispersible in all proportions with hydrocarbon lubricating oils. The invention and the manner in which its objects are achieved will be more readily understood by reference to the following preferred embodiments thereof. In these examples and throughout the specification, all proportions are expressed in parts by weight unless otherwise designated.

EXAMPLE I

*2,2'-thio bis(ethyl acid succinate)*

Between about 0.1 and about 0.2 mole of hydrogen sulfide and about 0.5 gram triethylamine were dissolved in about 150 cc. of dioxane at a temperature of about 25° C. Then approximately 28.8 grams (0.2 mole) of ethyl acid maleate were added in small increments over an hour and a half period. During this time hydrogen sulfide was also added at a sufficient rate to maintain the solution saturated with respect to this gas. The reaction mixture was then heated to about 40° C. for 8 hours while maintaining the hydrogen sulfide saturation. At the end of this period, the reaction was substantially complete and the solvent removed by vacuum distillation so as to separate it from the residual 2,2'-thio bis(ethyl acid succinate). The identity of this material was confirmed by chemical and infrared analyses.

EXAMPLE II

*Thio bis(oleyl succinimide)*

About 20.3 grams (0.06 mole) of oleyl amine were added to a solution of about 10 grams (0.03 mole) of thio bis(ethyl acid succinate) in approximately 125 cc. of toluene at about 30° C. The resultant reaction mixture was then heated to and maintain within the approximate temperature range of 135–140° C. for about 6 hours. During this period the water and ethanol formed as reaction by-products were continuously removed by means of a suitable trap. At the end of the 6 hour heating interval, the reaction was substantially complete. Subsequently the toluene was removed by distillation and the residual thio bis(oleyl succinimide) was characterized by infrared, nitrogen analysis and acid number.

In like manner many other thio bis succinyl compounds can be prepared in accordance with the present invention: The following compounds are illustrative of such products:

thio bis(ethyl succinimide)
thio bis(dodecyl succinimide)
thio bis(3-oleylaminopropyl succinimide)
thio bis(stearyl succinimide)
thio bis(oleyl succinimide)
thio bis(3-dimethylaminopropyl succinimide)

The terms "succinyl," "succiniate" and the like are used in their broadest sense throughout the specification and in the appended claims. These terms include methyl succinyl and methyl succinate, as well as the unsubstituted succinyl compounds. Thus derivatives of maleic, citraconic and itaconic acids are encompassed by them.

Numerous modifications will readily suggest themselves to those skilled in the art. Thus while the invention has been described with particular reference to specific embodiments, it is to be distinctly understood that it is not limited thereto but is to be construed broadly and restricted solely by the scope of the appended claims.

The embodiments of the invention in which an exclusive property or privilege is claimed are defined as follows:

1. A thio bis succinimide having the formula

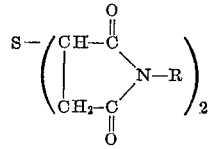

wherein R is hydrocarbon selected from the group consisting of alkyl, alkenyl, aryl or alkylaryl and is of a maximum of 20 carbon atoms.

2. Thio bis(ethyl succinimide).
3. Thio bis(dodecyl succinimide).
4. Thio bis(3-oleylaminopropyl succinimide).
5. Thio bis(stearyl succinimide).
6. Thio bis(oleyl succinimide).
7. Thio bis(3-dimethylaminopropyl succinimide).

No references cited.

ALEX MAZEL, *Primary Examiner.*

J. TOVAR, *Assistant Examiner.*